(12) United States Patent
Nuhn

(10) Patent No.: US 8,336,163 B2
(45) Date of Patent: Dec. 25, 2012

(54) COLLECTION MEANS FOR A MOBILE VACUUM APPARATUS FOR THE COLLECTION OF LIQUID OR SEMI-LIQUID MATERIALS

(75) Inventor: Dennis Nuhn, Sebringville (CA)

(73) Assignee: Nuhn Industries Limited, Sebringville (CA)

( * ) Notice: Subject to any disclaimer, the term of this patent is extended or adjusted under 35 U.S.C. 154(b) by 748 days.

(21) Appl. No.: 12/505,500

(22) Filed: Jul. 19, 2009

(65) Prior Publication Data

US 2009/0293911 A1     Dec. 3, 2009

Related U.S. Application Data

(63) Continuation-in-part of application No. 11/113,303, filed on Apr. 25, 2005, now Pat. No. 7,797,789.

(51) Int. Cl.
*A47L 9/06* (2006.01)
(52) U.S. Cl. ............................................. 15/401; 15/322
(58) Field of Classification Search .................... 15/401, 15/322; E01H 1/08; A47L 9/06
See application file for complete search history.

(56) References Cited

U.S. PATENT DOCUMENTS

| | | | |
|---|---|---|---|
| 3,040,785 A | 6/1962 | Grindle | |
| 3,585,670 A | 6/1971 | MacKinnon | |
| 4,218,226 A | 8/1980 | Boozer | |
| 5,010,620 A * | 4/1991 | Young | 15/347 |
| 6,647,578 B2 * | 11/2003 | Morgan et al. | 15/49.1 |

FOREIGN PATENT DOCUMENTS

| | | |
|---|---|---|
| CA | 2017587 | 12/1990 |
| GB | 1530904 | 11/1978 |

OTHER PUBLICATIONS

Loewen Welding & Manufacturing Ltd. 'Honey-Vac—Tractor Pull', www.loewanwelding.com/hv-tp.html, Jul. 19, 2009.

* cited by examiner

*Primary Examiner* — David Redding
(74) *Attorney, Agent, or Firm* — Brunet & Co. Ltd.; Robert A. H. Brunet

(57) ABSTRACT

The apparatus comprises a front-mounted collection means for a vacuum tank for the collection of liquid or semi-liquid materials. The collection means comprises a substantially V-shaped housing with a scraper at the bottom thereof, a height adjustable suction inlet at the apex thereof, and a pair of laterally adjustable pivoting wings for varying its width to correspond to that of an alley or gutter. A plurality of rotary feeders, each having a vertical axis of rotation, are mounted to the housing adjacent the scraper to prevent accumulation of the materials on the scraper. The feeders do not contact either the surface upon which the scraper is operated, nor the scraper itself, but serve to mix thick consistency materials with thinner consistency materials and also to dislodge any accumulation that does occur.

17 Claims, 10 Drawing Sheets

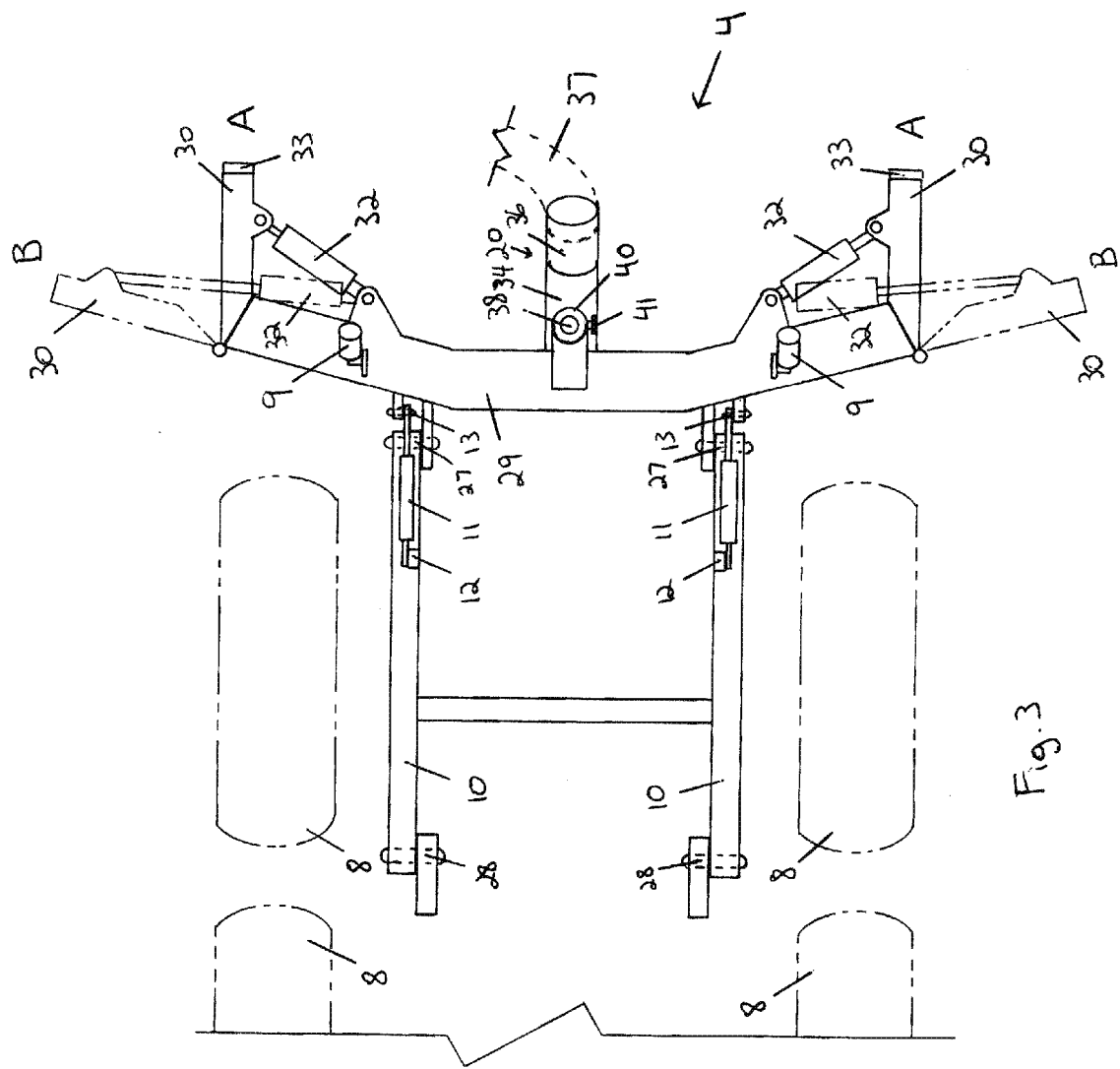

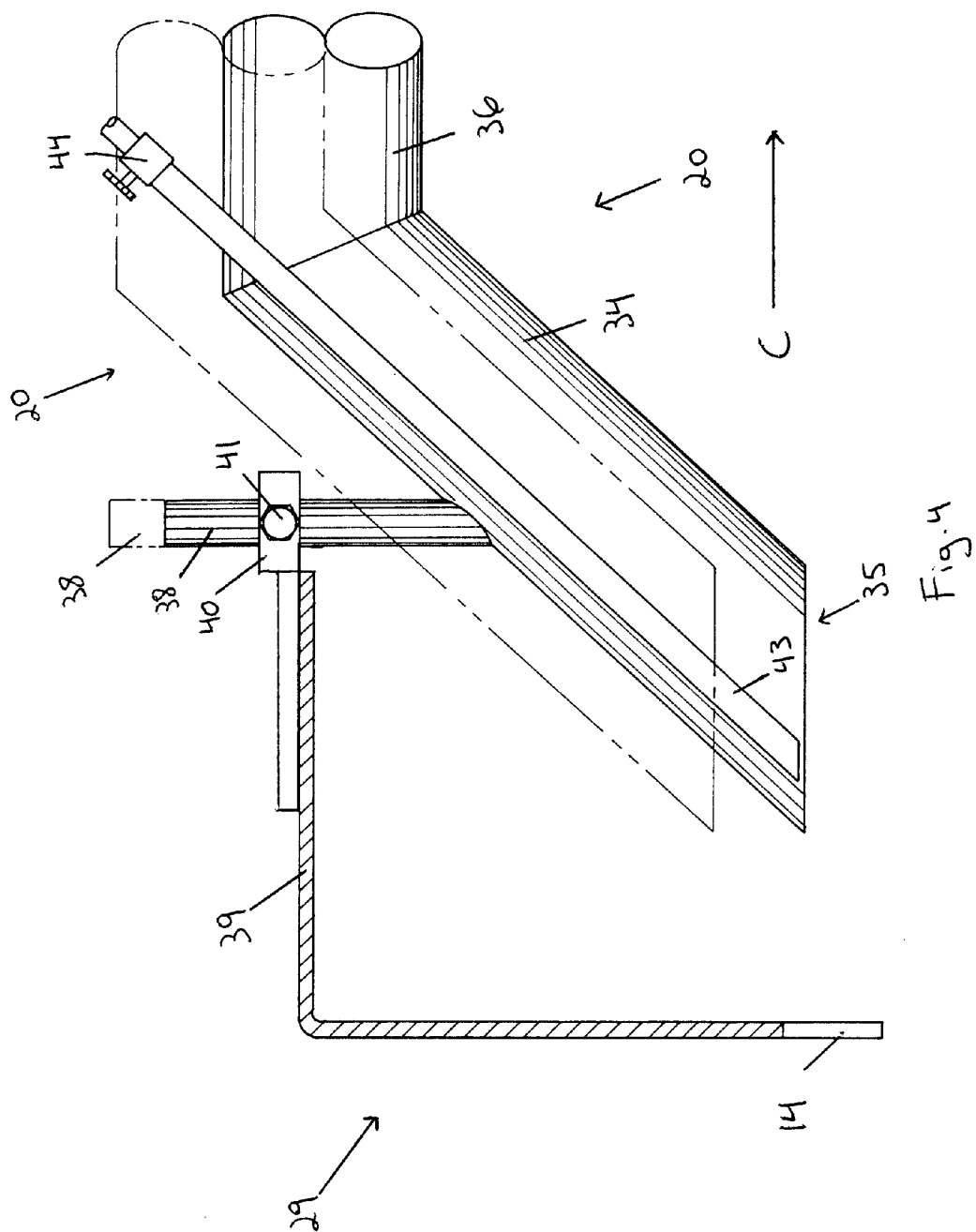

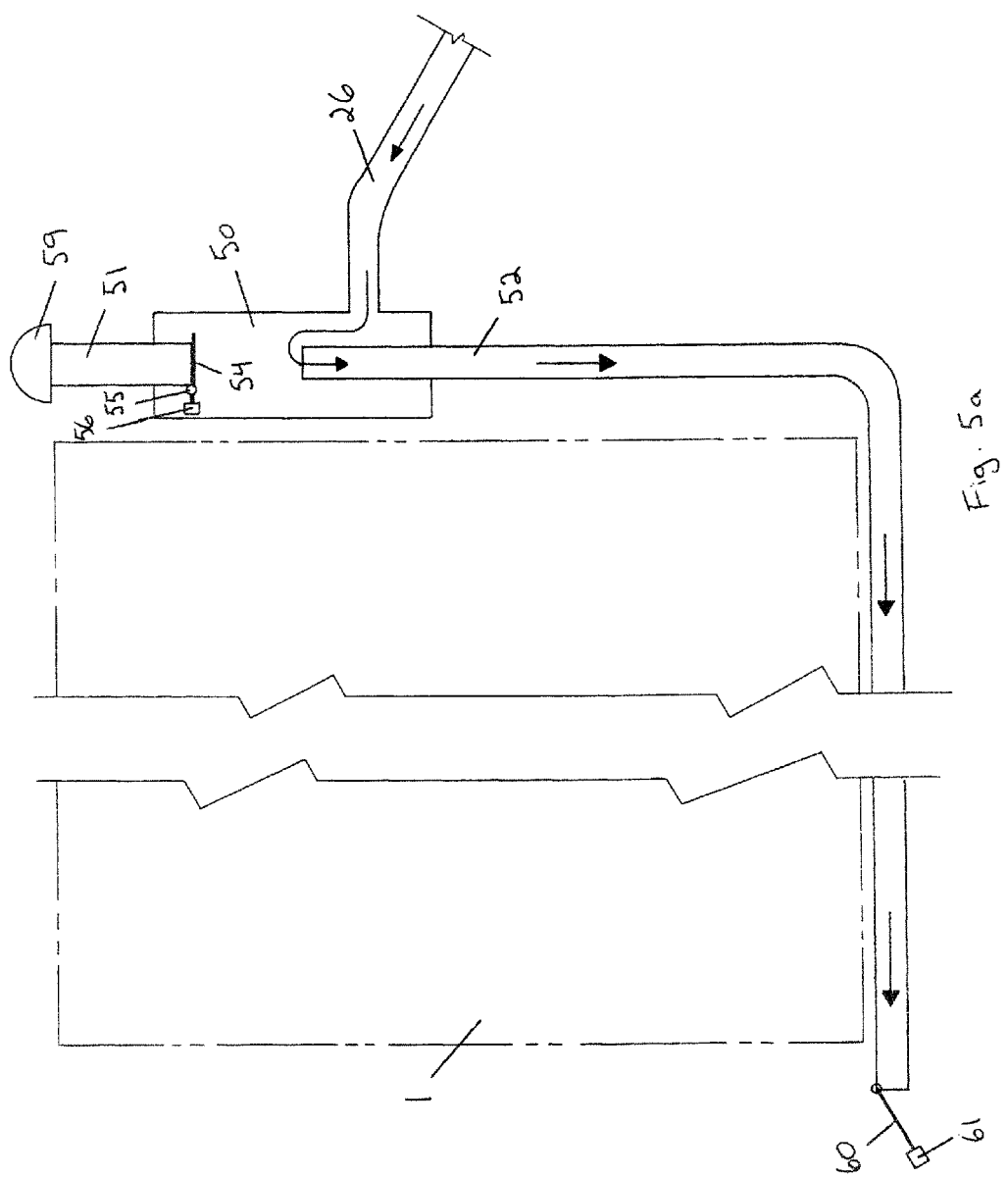

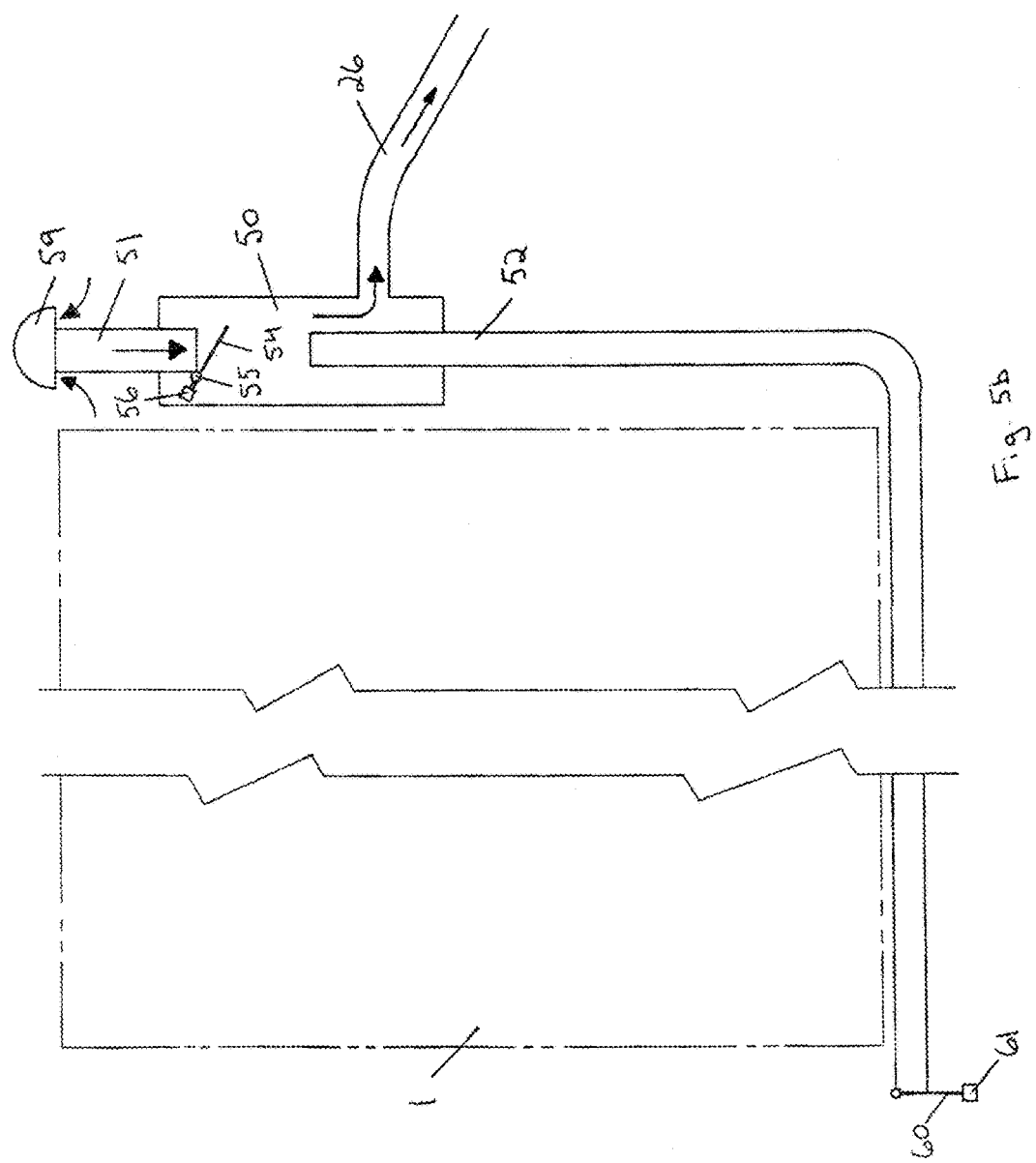

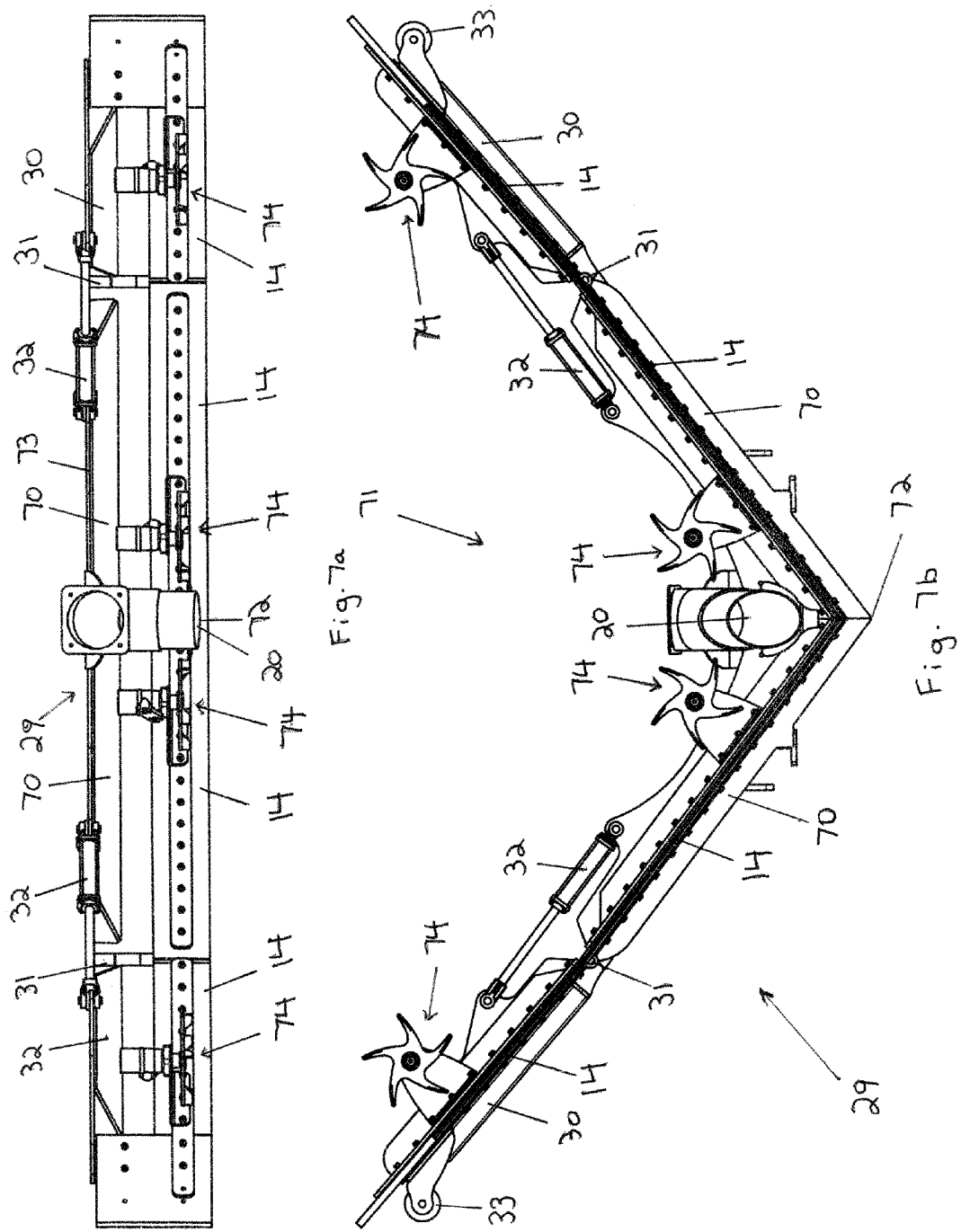

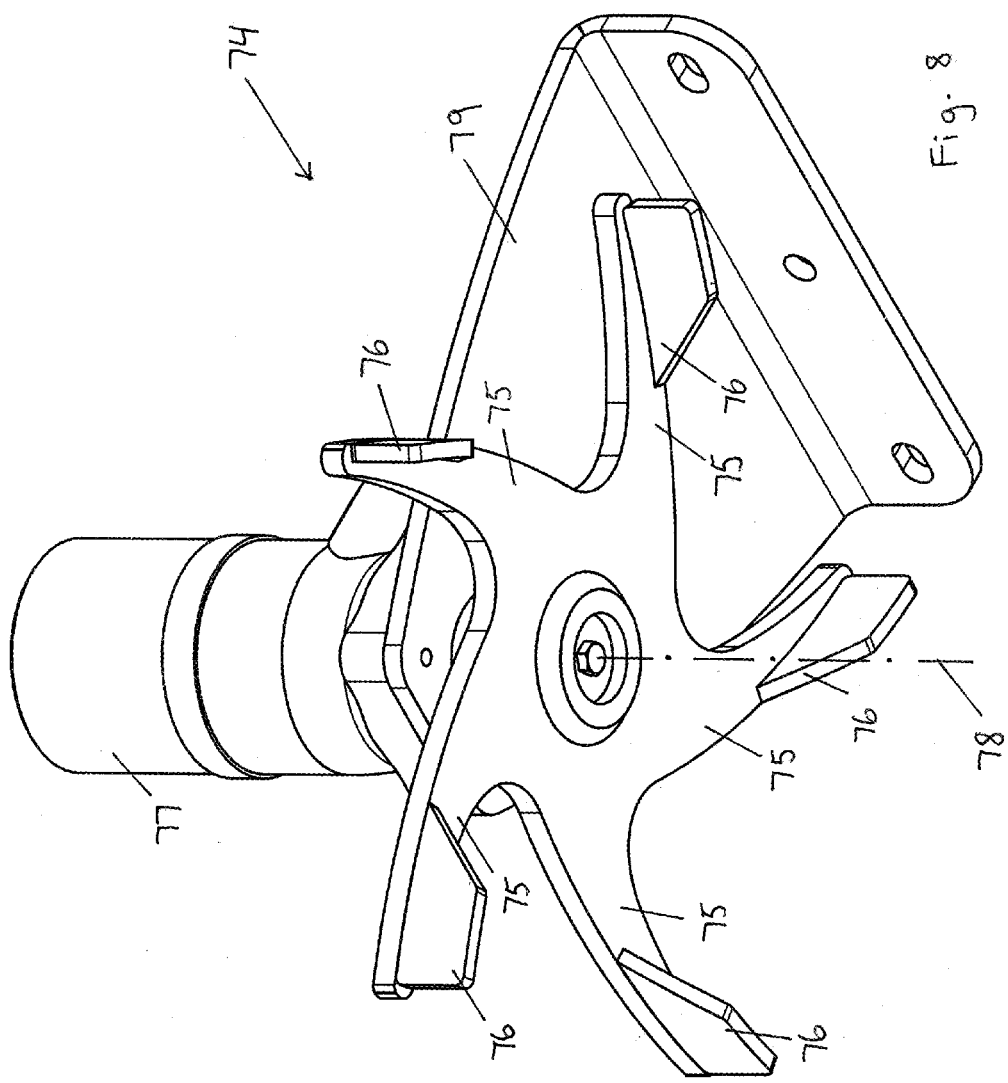

COLLECTION MEANS FOR A MOBILE VACUUM APPARATUS FOR THE COLLECTION OF LIQUID OR SEMI-LIQUID MATERIALS

CROSS REFERENCE TO RELATED APPLICATIONS

This application is a continuation-in-part of U.S. patent application Ser. No. 11/113,303, filed on Apr. 25, 2005, now U.S. Pat. No. 7,797,789.

FIELD OF THE INVENTION

The invention relates to the mobile pneumatic collection of liquid or semi-liquid materials such as animal manure. More specifically, the invention relates to a collection means for mounting beneath a mobile vacuum apparatus to direct the liquid or semi-liquid materials into a suction inlet when the apparatus is driven through the materials.

BACKGROUND OF THE INVENTION

Animal husbandry facilities, such as dairy or hog barns, include alleys or gutters for manure collection. Vehicles such as tractors or skid-steer loaders are equipped with scraper blades or front-end bucket systems to transfer manure accumulated in the alley or gutter to one end of the barn for removal and disposal. The manure is typically liquid or semi-liquid and is often difficult to transfer in this manner, as it escapes around the sides of the scraper blade or bucket. In addition, with the very large facilities that are becoming quite common in modern dairy farming, sometimes with an overall length in excess of 1000 feet, the quantity of accumulated material is too great to transfer to one end of the facility. As a result, there is a need for improvements in the collection and removal of manure from animal husbandry facilities.

Pneumatic collection of agricultural debris is used in a variety of operations both on and off the farm. For example, in the clean-up of spills of dry solid materials, such as grain or agricultural chemicals like fertilizer, vacuums are employed to pneumatically transfer the spilled materials to a storage container. An example of such a vacuum apparatus is provided in U.S. Pat. No. 4,218,226. These types of machines are not particularly well-suited to the collection of liquid or semi-liquid materials such as animal waste. Moreover, they lack any type of collection means for mounting beneath the apparatus to direct the collected material to the suction inlet when the apparatus is driven over the material, making them difficult to use in large scale mobile cleanup operations.

Vacuum systems have been used for mobile cleanup of relatively dry manure, such as chicken and horse manure. U.S. Pat. No. 5,010,620 discloses a stall and pasture vacuum machine that includes a front mounted sled comprising a rotary brush. A mist of water may be provided to soften the manure and make it more amenable to pneumatic conveying. The collected manure is stored in a dump box with a hinged rear door. This machine is not suitable for the cleanup of liquid or semi-liquid materials.

Vacuum systems have been used in the clean-up of liquid and semi-liquid animal waste. U.S. Pat. No. 3,585,670 discloses an apparatus comprising a vacuum tank and a rear-mounted V-shaped scraper blade. However, in mounting the scraper blade at the rear of the apparatus, the manure is compacted prior to being collected, making it difficult to separate from the barn floor and difficult to convey pneumatically.

Another vacuum apparatus for the collection of liquid or semi-liquid manure is manufactured by Loewen Welding & Manufacturing (Matsqui, BC, Canada) under the trade-name Honey-Vac®. In this apparatus, the collected manure enters the back of the vacuum tank from the top thereof. Since the collected manure is also discharged from the back, there is no complete flushing from front to rear during discharge. This leads to an accumulation of manure in the front of the tank that diminishes tank capacity after repeated use. The accumulated manure must be periodically cleaned out through manual access hatches, which is a dangerous and unpleasant task. Also, the apparatus makes use of separate blower and vacuum pumps, which creates mechanical complexity and increases down time.

As a result, there remains a need for an improved material collection apparatus, particularly for liquid and semi-liquid materials such as animal manure.

SUMMARY OF THE INVENTION

According to an aspect of the present invention, there is provided a mobile vacuum apparatus for collection of liquid or semi-liquid materials, the apparatus comprising: a frame having a front and rear; a set of wheels mounted under the frame; a vacuum tank for receiving collected liquid or semi-liquid materials, the vacuum tank having a vacuum inlet at a front thereof and a vacuum outlet at a top thereof; a collection means comprising a scraping element mounted under the front of the frame, the collection means in fluid communication with the vacuum inlet; a discharge outlet at a rear of the tank; and, a blower vac capable of drawing air from the vacuum tank through the vacuum outlet to thereby create a vacuum in the tank.

According to another aspect of the invention, there is provided a mobile vacuum apparatus for collection of liquid or semi-liquid materials, the apparatus comprising: a frame having a front and rear; a set of wheels mounted under the frame; a vacuum tank for receiving collected liquid or semi-liquid materials, the vacuum tank having a vacuum inlet at a front thereof and a vacuum outlet at a top thereof; a collection means in fluid communication with the vacuum inlet; a discharge outlet rearward of the collection means; a blower vac selectively capable of either drawing air from the vacuum tank through the vacuum outlet to thereby create a vacuum in the tank or blowing air into the vacuum tank to thereby expel the collected liquid or semi-liquid materials therefrom under pressure through the discharge outlet; and, a valve means for directing air to a blower vac exhaust when drawing air from the vacuum tank and for supplying air from an elevated blower vac intake when blowing air into the vacuum tank.

The apparatus is mobile and may be either pulled by a towing vehicle or self-propelled. The towing vehicle may be a farm tractor and the apparatus is particularly suitable for agricultural use. The apparatus is designed to be driven over the material to be collected with the collection means in front to reduce compaction of the material being collected. The material being collected may be any type of liquid or semi-liquid material suitable for pneumatic conveying. The material may comprise liquid waste. The material may comprise animal manure, such as manure from cows or pigs, and the animal manure may be in a semi-liquid state. The apparatus may be adapted for use in an animal husbandry facility, such as a dairy barn or milking shed, particularly such a facility that includes alleys or gutters for collection of manure.

It is desirable that the collected material is prevented from entering the blower vac, as obstruction of its internal moving parts can cause significant damage to the blower vac. The vacuum tank includes a vacuum outlet that may comprise two or more vacuum outlets spaced apart along the top of the tank. By using two or more vacuum outlets, the velocity through each outlet is decreased, thereby reducing the likelihood that the collected material can become entrained in the air flowing through the outlets. The outlets may be of the same size or different sizes in order to preferentially direct the collected material to different parts of the tank. Each outlet may include a primary trap to further reduce the likelihood of material escaping through the vacuum outlet, particularly when the tank is full. Any suitable primary trap design may be used and the primary trap is preferably readily cleaned by reducing the air flow through the vacuum outlet.

Air flowing from the vacuum outlet may be directed to a secondary trap for yet further reducing the likelihood that entrained debris will enter the blower vac. The secondary trap may be of any suitable design and may comprise a chamber containing a series of baffle plates that are arranged to create a serpentine path. Alternatively, the chamber may contain a plurality of perforated impingement plates stacked with the perforations in an offset relationship. The secondary trap may be similar to a knock-out pot in that it may be designed for the removal of liquid from the air flow, particularly liquid droplets. The secondary trap may be cleaned by reversing the direction of air flow through the trap and may be additionally or alternatively cleaned using a supplemental stream of air or water to flush out the contents of the trap. The secondary trap may include a drain and the drain may be directed back into the vacuum tank. The outlet of the secondary trap is preferably free of collected material or droplets and is provided to the blower vac.

The blower vac may be powered by a motor of the towing vehicle or by a motor mounted on the apparatus itself. A separate motor may be used to independently power the blower vac. The towing vehicle may be connected to the blower vac using a power take-off (PTO) mechanism. The blower vac may comprise a single unit or two separate but connected units. The blower vac may comprise two chambers connected to a single power source. The blower vac may comprise an internal valve that permits the flow path through the blower vac to be altered in order to switch the intake port of the blower vac to the exhaust port and vice versa. The blower vac may be reversible in order to alternate intake and exhaust ports. The blower vac may comprise a positive displacement pump, such as a rotary vane pump. The blower vac may be in fluid communication with a valve means.

The valve means may be used as part of any liquid or semi-liquid material collection system that both draws and expels material pneumatically. The valve means may be automatically adjustable or manually adjustable. The valve means may comprise a three-way valve mechanism that permits selection of a single flow path from two different flow paths, for example and L-ported ball valve that may be alternated between two flow paths. The valve means may comprise a pair of check valves, one check valve in each of the intake and exhaust flow paths. The check valves may be oppositely oriented to permit air to flow into the valve means through only one flow path (the intake flow path) and out of the valve means by only the other flow path (the exhaust flow path). In this manner, the valve means is automatically adjustable in response to a change in the direction of flow through the blower vac. The valve means may include a valve chamber and the check valves need not necessarily both be located in the valve chamber. The valve means is particularly advantageous in allowing an air intake and exhaust of the system to be separated, thereby permitting the intake to be elevated with respect to the material being collected and the exhaust to be located distantly from the operator. The elevated exhaust reduces the likelihood of debris entering the blower vac when blowing air into the tank and the distant exhaust improves operator health and safety.

The collection means may be any suitable mechanism for directing the material toward the pneumatic collection inlet and may include, for example a brush, rotating brush, scraper, squeeqee, air blast, water jet, or a combination thereof. The scraper may comprise a scraping element made from a rigid yet flexible material, such as a high durometer or reinforced rubber. The collection means may be height adjustable and may be either self-leveling or manually level adjusted with respect to the material collection surface. The suction inlet of the pneumatic collection system may be through a distribution means to permit collection across the width of the collection means or collection may occur at a discrete point or points. The collection means may have a shape adapted for funneling the material toward the suction inlet, for example a V-shape when seen in plan view.

The suction inlet may be height adjustable independently of any height adjustment of the collection means in response to the quantity of material being collected; this permits a scraping element of the collection means to remain in contact with the floor surface while allowing the suction inlet to be adjusted relative in height thereto in response to a large quantity of material being collected. Any suitable mechanism may be employed to adjust the height of the suction inlet. The suction inlet is preferably connected to the vacuum inlet by a flexible connection in order to facilitate the height adjustment. By setting the suction inlet closer to the floor surface that the material is being collected from more material may be collected, thereby leaving less material in the collection means at the end of a pass through an alley. However, if set close to the floor, the suction inlet will have more material to pick-up and driving speed may have to be reduced. There is therefore an optimal trade-off between speed and completeness of collection. A snorkel may be provided alongside the suction inlet for introducing a small quantity of air into the material as it is being collected. This small quantity of air is entrained with the material and makes it easier to lift from the floor and easier to pneumatically convey, particularly for materials with a thick consistency. The snorkel may include a small valve to set the quantity of air provided to the suction inlet according to the consistency of the material being collected.

The collection means may include a variable width mechanism. The variable width mechanism is particularly useful in the collection of manure from alleys or gutters, as it allows the collection means to fit the width of the alley or gutter and reduces the likelihood of manure escaping around the sides of the collection means. The collection means may include wings that are pivotally attached to each side of the collection means and able to pivot about a vertical pivot axis. The wings may be biased outwardly towards or against the sidewalls of the alley or gutter and may resiliently adapt to changes in the width of the gutter by pivoting about the vertical pivot axis. The wings may move about the vertical pivot axis in response to a change in the distance between the side-wall of the alley and the collection means. The wings may be biased by a spring means or a suitable fluid cylinder arrangement, such as a pneumatic or hydraulic fluid displacement cylinder, a captive gas shock absorber, or a combination thereof. The wings may automatically adjust to the width of the alley or gutter or may be manually adjusted by an operator of the apparatus. The adjustment may be conducted using controls within the towing vehicle. The wings may include skid plates or wear strips to reduce the likelihood of damaging the wings due to operator driving error.

The discharge outlet is provided at the rear of the vacuum tank. The discharge outlet may be connected to any manure distribution system suitable for liquid or semi-liquid manure, such as a spreader plate or sub-surface injection system. Alternatively, the discharge outlet may be connected via a fluid conduit for transferring the manure to a separate spreading apparatus or a holding vessel. The vacuum inlet is provided at the front of the tank, preferably in a lower half thereof below the horizontal midline of the tank. Filling the tank from the front and discharging the tank through the rear causes a flushing of the collected materials through the tank. This causes substantially all of the material in the tank to be discharged and mitigates material build-up in the front of the tank. During collection, a remotely operable valve on the discharge outlet is closed to prevent inadvertent leakage from occurring. During tank discharge, a remotely operable valve on the vacuum inlet is closed to prevent material from being discharged through the collection means.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 3 is a top view of the collection means of FIG. 2;

FIG. 4 is a side view of the height adjustable suction inlet of the present invention;

FIG. 5a is a schematic side view of the valve means of the present invention while air is being drawn from the vacuum tank;

FIG. 5b is a schematic side view of the valve means of the present invention while air is being blown into the vacuum tank;

FIG. 7a is a front view of the collection means of FIG. 6;

FIG. 7b is a bottom view of the collection means of FIG. 6; and,

FIG. 8 is a bottom perspective view of a rotary feeder for the collection means of FIG. 6.

DESCRIPTION OF PREFERRED EMBODIMENTS

Figure 1A:
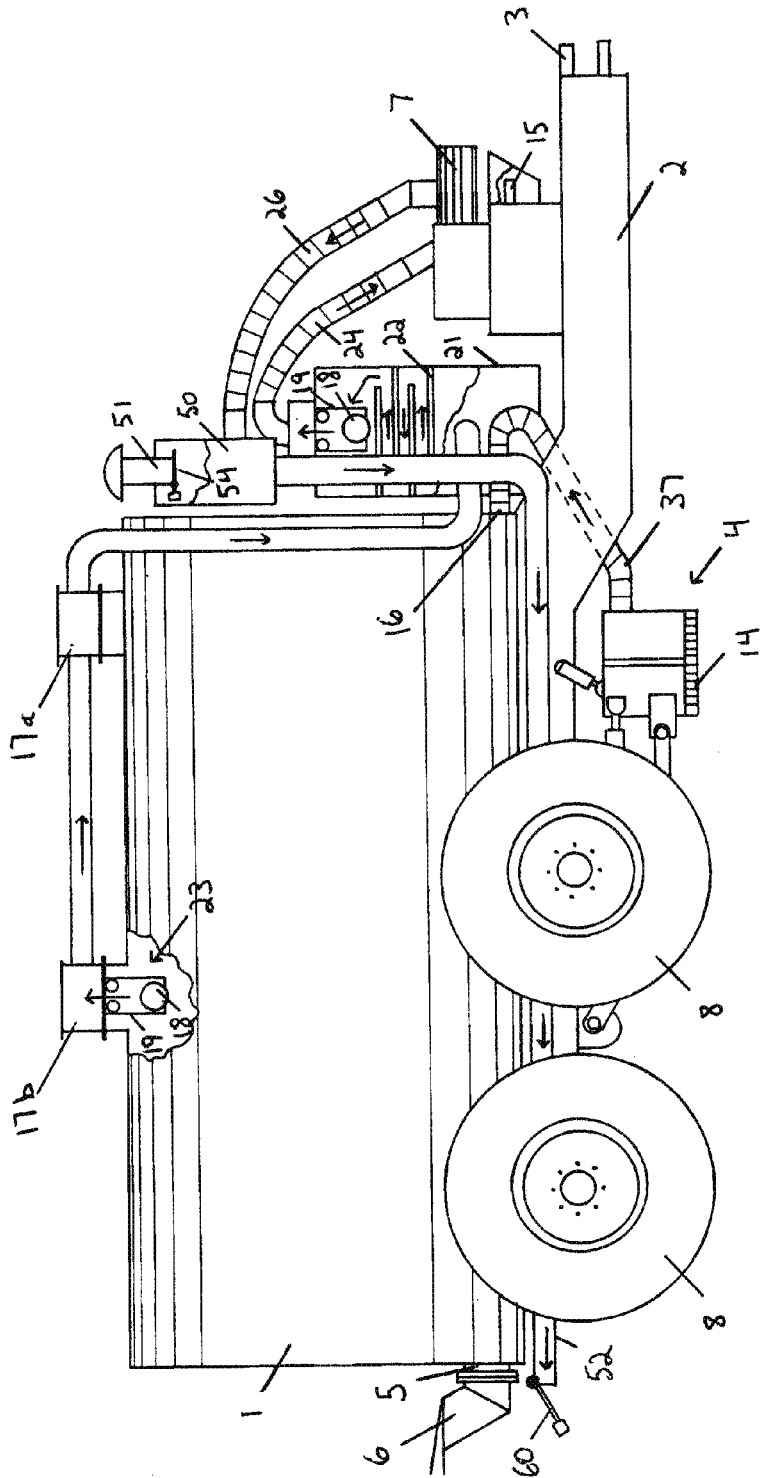
FIG. 1a is a side view of the apparatus according to the present invention showing a flow path through the apparatus when material is being collected.

In describing the figures, like features are referred to by like reference numerals. Although not all features indicated on a particular drawing are necessarily described with reference to that drawing, all of the features are described with reference to at least one of the drawings.

Figure 1B:
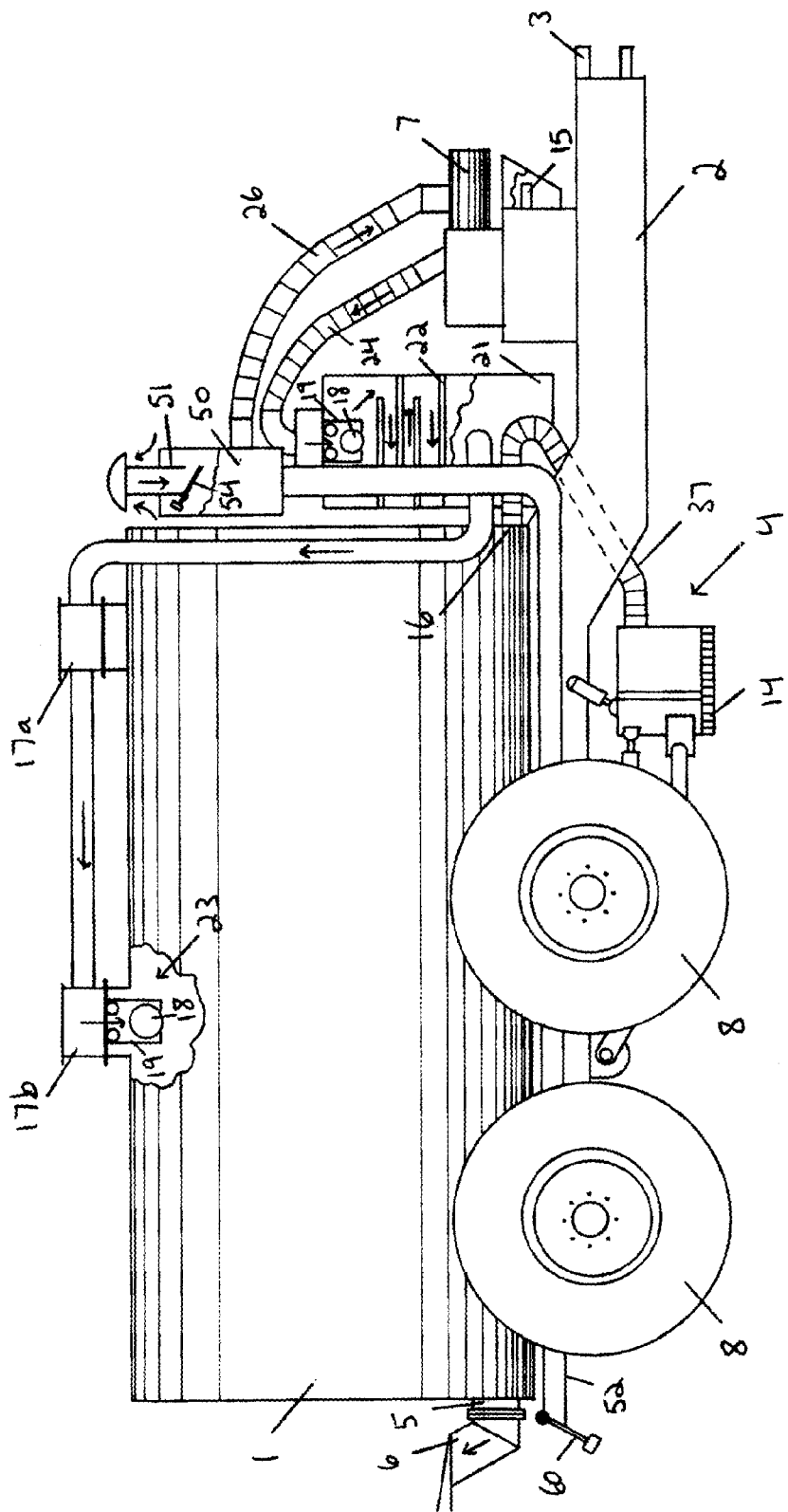
FIG. 1b is a side view of the apparatus according to the present invention showing a flow path through the apparatus when material is being discharged.

Referring to FIGS. 1a and 1b, the mobile vacuum apparatus comprises a vacuum tank 1 mounted on a frame 2 having a front and rear with a hitch means 3 for connection to a towing vehicle (not shown) at the front of the frame. A collection means 4 is mounted to the underside of the frame 2 at the front thereof, forward of a discharge outlet 5 of the vacuum tank 1. A spreader means 6 is attached to a flange on the discharge outlet 5. A set of tandem wheels 8 is mounted to the underside of the frame 2 using a walking-axle arrangement as is conventionally known.

A blower vac 7 is provided at the front of the frame 2. The blower vac 7 is a positive displacement rotary vane pump (in a preferred embodiment, a Wallenstein type pump) that can operate as either a blower or vacuum pump. The blower vac 7 is a single integrated unit capable of selectively drawing air from the vacuum tank or blowing air into the vacuum tank. An integral valve (not shown) is provided as part of the blower vac 7 to switch between drawing air from and blowing air into the vacuum tank 1. The pump derives power from the towing vehicle via a PTO shaft 15.

FIG. 1a schematically shows a flow path through the apparatus when material is being collected. The collection means 4 is lowered with respect to ground level and parallel thereto with a scraper element 14 in contact with the floor surface. Material is admitted into a suction inlet (not shown in FIGS. 1a and 1b) of the collection means 4 and drawn through suction conduit 37 into vacuum inlet 16 of vacuum tank 1. The vacuum inlet 16 is located on the front of the vacuum tank 1 in the lower half thereof below the horizontal midline of the tank. This causes the collected material to fill the tank from front to rear, improving weight distribution and facilitating substantially complete discharge. The air is then drawn out of the vacuum tank 1 through vacuum outlet 17, which comprises front vacuum outlet 17a and rear vacuum outlet 17b. The use of two vacuum outlets 17a and 17b reduces the exit air velocity by half as compared with a single outlet, significantly reducing the likelihood of debris becoming entrained and exiting through the vacuum outlet 17. Each vacuum outlet 17a and 17b is equipped with a primary trap 23 comprising a stainless steel ball float 18 captivated within a rigid mesh cage 19. The rigid mesh cage 19 helps prevent material from exiting the tank 1 through the vacuum outlet 17. As the level of material in the vacuum tank 1 rises to the top of the tank, the float 18 rises and blocks the outlet 17 to prevent material from being drawn out of the tank. The primary trap 23 therefore serves as a first line of defense in keeping the collected material within the tank 1.

Air drawn through the vacuum outlet 17 is next directed into secondary trap 21 at the bottom thereof. The secondary trap 21 includes a plurality of stacked baffles 22 arranged to create a serpentine flow path through the trap 21. This causes disengagement of any materials entrained in the air flow, particularly liquid materials which may have passed the mesh cage 18 of the primary trap 23. The secondary trap 21 includes a drain (not shown) for re-introducing any collected material back into the vacuum tank 1. The secondary trap 21 may be cleaned using supplementary flows of water or air provided through ports (not shown) at the top thereof. The exit of the secondary trap 21 is protected by a stainless steel ball float 18 captivated within a rigid mesh cage 19 in an arrangement similar to that of the primary trap 23.

Air exiting the secondary trap 21 is provided to the blower vac 7 through first blower vac conduit 24 and exits therefrom through second blower vac conduit 26. The air is provided to a valve means comprising a valve chamber 50 and pressurizes the valve chamber, causing the second closure means 60 to open and allowing the air to exit through the anterior end of blower vac exhaust 52.

In FIG. 1b, the apparatus is illustrated in a tank discharge condition. The blower vac 7 creates a negative pressure or vacuum in the valve chamber 50. This causes the first closure means 54 to open, admitting air into the valve chamber 50 through blower vac intake 51. The air then flows through the second blower vac conduit 26 into the blower vac 7, which acts to blow the air out through first blower vac conduit 25. The air flows downwardly through the secondary trap 21, back flushing any accumulated debris out through the drain (not shown) and into tank 1. The air then passes out of the bottom of the secondary trap 21 and into the vacuum outlet 17 at the top of the vacuum tank 1. The primary trap 23 is back flushed to dislodge any debris accumulated against the mesh cage 19. A positive pressure is created in the vacuum tank 1, which forces the collected material outwardly through rear discharge outlet 5. A remotely operable discharge valve (not shown) is opened during discharge to allow material to exit through the spreader means 6 and is closed during collection of material. Conversely, a remotely operable suction valve (not shown) is closed during tank discharge to prevent material from exiting through the collection means 4 and is opened during collection of material.

The introduction of air through the first vacuum outlet 17a causes material accumulated at the front of the tank to be pushed downwardly and out through the discharge outlet 5. In this manner, a complete flushing of the vacuum tank 1 occurs to expel substantially all of the material in the tank (as compared with prior art systems) reducing the need for manual cleanout of the front of the vacuum tank.

Figure 2:
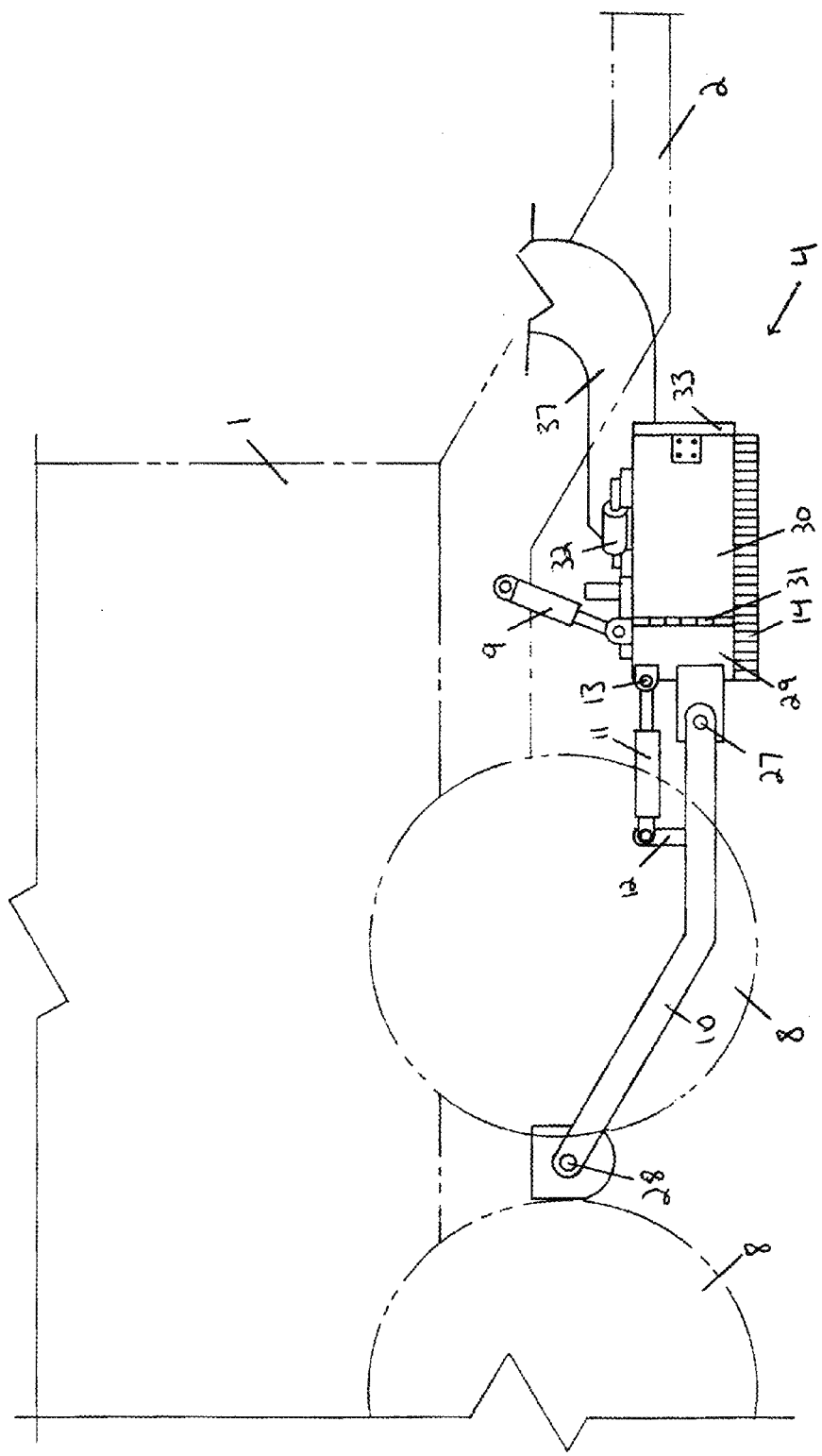
FIG. 2 is a side view of an embodiment of a collection means according to the present invention.

Referring to FIGS. 2 and 3, the collection means 4 is pivotally mounted to the underside of the frame 2 by way of pivot arm 10. Pivot arm 10 is pivotally attached at one end to a central portion 29 of the collection means 4 at first pivot pin 27 and at the other end to the frame 2 at second pivot pin 28, which is located between the tandem wheels 8. A hydraulic lift cylinder 9 is provided between the central portion 29 and the frame 2 and may be extended or retracted to lower or raise, respectively, the collection means 4 by pivoting of the pivot arm 10 about the second pivot pin 28. The collection means 4 is typically raised when turning the apparatus to prevent damage to the collection means due to skid-induced lateral forces.

An adjustable length link 11 is pivotally attached at one end to an upwardly extending stub 12 fixedly mounted on the pivot arm 10. The other end of the link 11 is pivotally attached to the central portion 29 at link pivot 13, which is located above the first pivot pin 27. By adjusting the length of the link 11, a fine tilting adjustment of the central portion 29 may be attained so as to ensure that the scraper element 14 attached to the underside of the collection means 4 remains in contact with the floor or other surface from which the materials are being collected. The scraper element 14 comprises a high durometer rubber scraping edge with a steel reinforcement. This permits the scraping element 14 to conform somewhat to irregularities in the scraped surface while providing sufficient rigidity to remove adherent materials. The rubber scraping edge also provides a squeegee effect similar to an automotive windshield wiper that permits liquid or semi-liquid materials to be scraped.

The collection means 4 further comprises a pair of laterally adjustable wings 30 that are attached to the central portion 29 on opposite sides thereof. Each wing 30 is pivotally attached to the central portion 29 using a piano hinge 31 that allows the wing to pivot about a vertical pivot axis passing through the center of the hinge. A hydraulic wing cylinder 32 is pivotally attached to each wing 30 and to central portion 29 so that extension of the wing cylinders causes the wings to open, thereby increasing the width of the collection means 4. The wings 30 are closed by retracting the wing cylinders 32. The normal range of movement of the wings 30 is from a closed position parallel to the longitudinal axis of the apparatus (defined by its direction of travel) to an open position which is at an angle less than perpendicular to the longitudinal axis and preferably tangential to the central portion 29 at the hinges 31. FIG. 3 shows the closed position (marked A) and also shows the open position (marked B) in phantom lines. In the open position, the wings 30 extend past the wheels 8. The wings 30 are normally closed when transporting the apparatus to reduce the risk of damaging the wings.

The wings 30 may be controlled using a single circuit so that they both open and close at the same time or using separate circuits so that one or the other of the wings may be opened or closed. In addition, the wings 30 need not be completely opened, but can be set to any desired angle of opening. This is particularly advantageous when scraping a large area without side-walls. When scraping an alley or gutter with side-walls, such as in an animal husbandry facility, the wings 30 are preferably opened until a skid protector 33 attached to the distal end of each wing comes into contact with the side-wall. The skid protector 33 may be made from metal or a durable plastic, preferably a plastic with dry lubricant qualities such as Delrin®. A pressure relief valve (not shown) is provided in each hydraulic circuit of the wing cylinders 32 in order to permit the wings 30 to close by rotating about the vertical pivot axis in response to a decrease in distance between the collection means 4 and the side-wall. The valves may be adjusted to maintain a modest cylinder extension pressure so that the wings 30 return to the desired pre-set open position when the distance between the collection means 4 and the side-wall increases. The net effect is that closing of one wing 30 due to distance changes while driving is matched by a corresponding opening of the opposite wing.

A height adjustable suction inlet 20 is provided at about the center of the central portion 29. Referring to FIG. 4, the suction inlet 20 has a 45° bend so that a lower portion 34 forms a downwardly oriented nozzle opening 35 that is roughly parallel with the floor (subject to fine level adjustment using adjustable length link 11). The upper portion 36 of the suction inlet 20 is attached one end of flexible suction conduit 37. The other end of suction conduit 37 is attached to the vacuum inlet 16 of vacuum tank 1. The flexible suction conduit 37 permits the height of the suction inlet 20 to be adjusted without constraint by the conduit. An upright post 38 is fixedly attached to the suction inlet 20. The central portion 29 has an inverted L-shaped cross-section with a top portion 39 to which a collar 40 is mounted. The collar 40 is forwardly offset from the central portion 29 and has a bore that is complementary in size to the upright post 38. The bore permits sliding passage of the upright post 38 through the collar 40. A user-adjustable set screw 41 is provided in the collar 40 for threading engagement with the upright post 38. By loosening the set screw 41, the upright post 38 is permitted to slide through the bore of the collar 40, allowing the height of the suction inlet 20 to be raised or lowered relative to ground level. Tightening the set screw 41 allows the desired height of the suction inlet 20 to be fixed. During forward travel of the apparatus in the direction indicated by arrow C, the liquid or semi-liquid material being collected accumulates within the inverted L-shaped cross section of the central portion 29 and is constrained from overflowing by the top portion 39 thereof. The height of the suction inlet 20 is typically adjusted higher for thick semi-liquid materials and lower for liquid materials. In an alternative embodiment, the height of the suction nozzle may be adjusted by an operator within a tractor or towing vehicle using hydraulic controls.

A snorkel 43 is provided alongside the suction inlet 20. The snorkel 43 permits a small quantity of air to be introduced into the opening 35 for entrainment with the materials being collected by the suction inlet 20. It has been found that the introduction of air by the snorkel 43 is of particular use in the collection of thick semi-solid materials, as the two-phase flow produced tends to aid in pneumatically conveying the materials into the vacuum tank 1. A snorkel valve 44 may be adjusted to deliver the desired amount of air to the suction inlet 20 according to the consistency of the materials being collected.

Referring to FIGS. 5a and 5b, a valve means is schematically shown as part of the blower vac intake/exhaust system. A valve chamber 50 is provided with an elevated blower vac intake 51 extending upwardly therefrom and a blower vac exhaust 52 extending downwardly therefrom. The second blower vac conduit 26 extends from the side of the valve chamber 50 and permits flow in either direction between the blower vac 7 and the valve chamber. The second blower vac conduit 26 is preferably provided tangentially to the valve chamber 50 and laterally offset from the vertical centerline thereof to create a swirling flow pattern and cyclonic action within the valve chamber. The valve chamber 50 can be shaped and/or include supplementary flow elements to enhance this flow pattern. The cyclonic action is used as an aid in removing dust or debris when the blower vac intake 51 is being used to supply air for blowing into the vacuum tank 1.

FIG. 5a shows the valve means in operation when drawing air from the vacuum tank 1. A first closure means 54 is pivotally attached to the lower end of the blower vac intake 51 within the valve chamber 50 by closure hinge 55. The first closure means 54 has a counterweight 56 on an opposite side of the closure hinge 55 from the blower vac intake 51. The counterweight 56 biases the first closure means 54 into a closed position to seal the end of the blower vac intake 51. The valve chamber 50 is pressurized when air is drawn from the vacuum tank 1 and the air pressure helps maintain the first closure means 54 in a closed position. The pressurized air escapes through blower vac exhaust 52. The blower vac exhaust 52 is downwardly oriented from the valve chamber 50 and is routed along the underside of the frame 2. An opening at the anterior end of the blower vac exhaust 52 directs the foul-smelling air drawn from the vacuum tank 1 downwardly and away from the operator of the apparatus, who is located in the towing vehicle attached to the front hitch means 3. This improves the overall health and safety of the operator. A second closure means 60 is pivotally attached to the anterior end of the blower vac exhaust 52. A closure weight 61 is provided to bias the second closure means 60 into a closed position over an opening in the anterior end of the blower vac exhaust 52. However, the flow of pressurized air provided from the valve chamber 50 is sufficient to overcome this bias and causes the second closure means 60 to open, thereby allowing air to escape through the opening.

Referring to FIG. 5b, the valve means is shown in operation during tank discharge when the blower vac 7 is used to blow air into the vacuum tank 1. The flow path through the second blower vac conduit 26 is reversed as compared with FIG. 5a and the valve chamber 50 is under vacuum. The vacuum overcomes the bias provided by the counterweight 56 and causes the first closure means 54 to open, admitting air into the valve chamber 50 through the blower vac intake 51. A filter 59 is provided atop the blower vac intake 51 to remove debris from the intake air stream in order to reduce the potential for damage to the blower vac 7. The negative pressure within the valve chamber 50 enhances the bias on the second closure means 60 provided by the closure weight 61 and acts to seal the blower vac exhaust 52.

By referring to FIGS. 5a and 5b, it can be seen that the first and second closure means 54 and 60 of the valve means act as oppositely oriented check valves that permit flow in only one direction through each of the blower vac intake 51 and blower vac exhaust 52. The valve means permits flow through one flow path or the other, depending on the direction of flow through the second blower vac conduit 26. The first and second closure means 54 and 60 automatically close or open according to whether air is being drawn from the vacuum tank 1 or blown into the vacuum tank 1.

Figure 6:
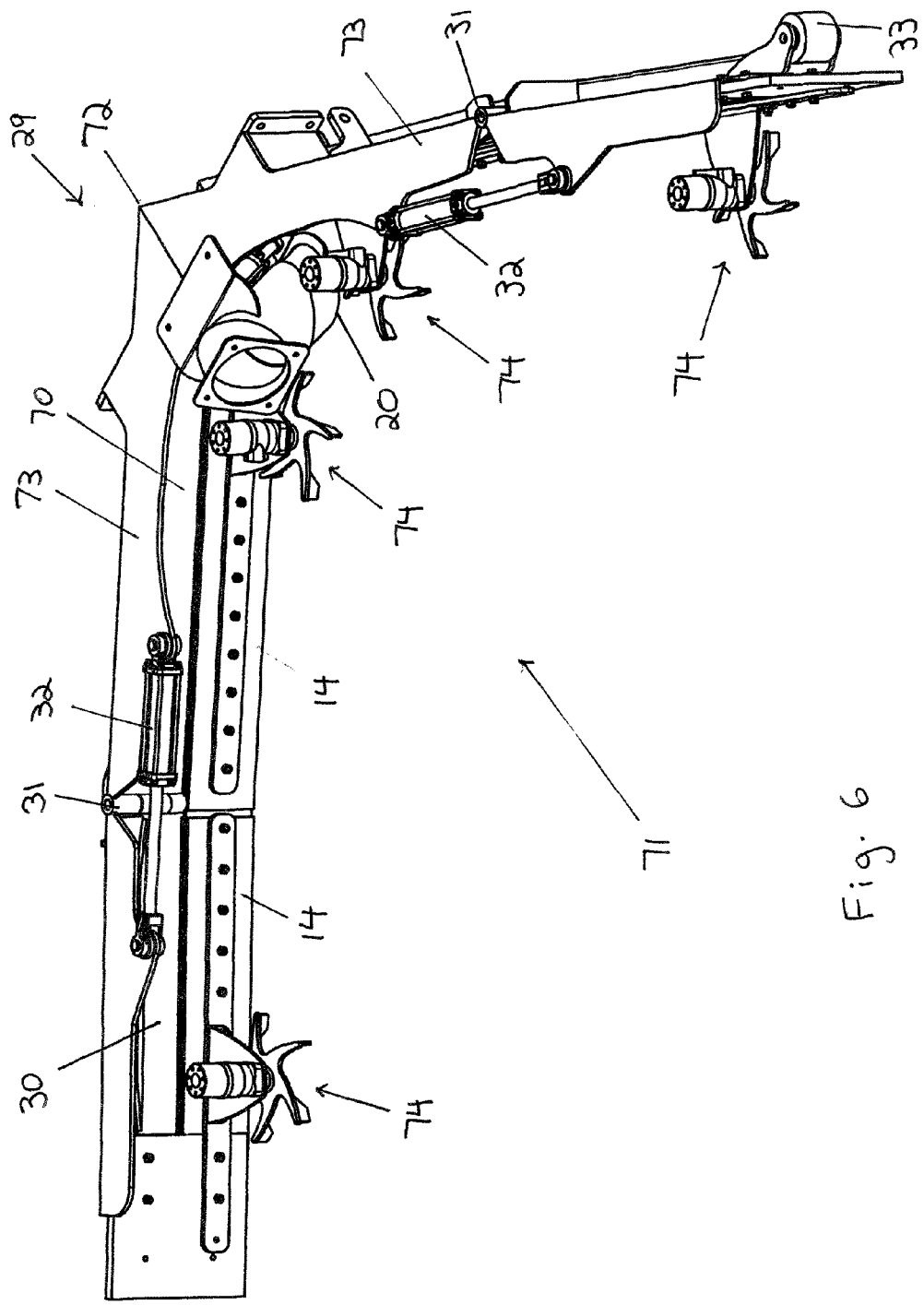
FIG. 6 is a perspective view of another embodiment of a collection means according to the present invention.

Referring to FIGS. 6 and 7a-b, an alternative embodiment of a collection means for use with the mobile vacuum apparatus is shown. The central portion 29 of the collection means comprises two forward angled sides 70. Each of the sides 70 has a scraper element 14 located at a bottom thereof for accumulating the liquid or semi-liquid materials within an interior 71 of the central portion 29 when the apparatus is in use. The forward angled sides converge at an apex 72 such that the central portion 29 appears substantially V-shaped when seen in top view. In another alternative embodiment, the central portion 29 appears trapezoidal when seen in top view. The suction inlet 20 is located at a middle of the central portion 29, adjacent the apex 72. In order to prevent the collected materials from overflowing the interior 71, the central portion 29 is provided with a top flange 73, which causes it to have the aforementioned inverted L shaped vertical cross-section. The wing cylinders 32 are pivotally mounted to the top flange 73 in order to permit the wings 30 to pivot about the piano hinge 31 as previously described. Each wing is equipped with a scraper element 14 at a bottom thereof and a skid protector 33, as previously described, to permit the wings to open in order to vary the width of the collection means 4 to match the width of the alley or gutter being scraped.

During the collection of certain semi-liquid materials, particularly those with a thick and/or sticky consistency, there can be a tendency for accumulation to occur along the scraper element, thereby interfering with proper operation of the vacuum apparatus. To help mitigate this problem, the collection means 4 is provided with a plurality of rotary feeders 74 located adjacent the scraper element within the interior 71. Preferably, there is at least a rotary feeder 74 provided on either side of the suction inlet 20. More preferably, there is at least a rotary feeder 74 provided on either side of the suction inlet 20 and at least a rotary feeder 74 provided on each wing 30.

Referring additionally to FIG. 8, each rotary feeder 74 is equipped with a hydraulic motor 77 mounted atop a feeder mounting bracket 79. The hydraulic motor 77 is mounted to provide a vertical axis of rotation 78. A set of radially extending protrusions 75 concentric with the axis 78 is mounted to the output shaft of the motor 77 below the bracket 79. The protrusions 75 are substantially scoop shaped, curving away from the direction of rotation of the motor 77, although need not necessarily be so. Each protrusion 75 is rigid and equipped with a downwardly extending lip 76 on the bottom thereof. Use of an independent hydraulic motor 77 for each rotary feeder 74 allows the rotational speed of each feeder to be adjustable, if so desired. The rotational speed is determined according to the consistency of the materials being collected, the height of the suction inlet 20 and/or the rate of travel of the mobile vacuum apparatus. The rotational speed may be adjusted by an operator of the tractor used to pull the apparatus; for example, one, two or more sets of hydraulic remotes may be employed and the speed of the connected motors may be adjusted using a control lever located in the tractor. Two or more motors may be connected in parallel to a set of hydraulic remotes. In one embodiment, the rotational speed of the rotary feeders 74 on the wings 30 is separately adjustable from the rotational speed of the rotary feeders 74 on the central portion 29, since more material accumulates near the apex 72 and hence a higher speed is sometimes needed for the feeders 74 closest to the suction inlet 20.

Referring particularly to FIG. 7a, it is important to note that the height of the rotary feeders 74 is elevated with respect to ground level, typically by an amount of from 1 to 2 inches. In other words, the rotary feeders are not in contact with the ground, nor with the scraper element 14. The feeders 74 simply function to reduce accumulation of material adjacent the scraper element 14 by mixing thinner material with thicker material in order to make it more amenable to scraping. In the event that a significant amount of material does accumulate, the feeders 74 dislodge the material in order to transfer it towards the apex 72.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A collection means for use with a mobile vacuum apparatus for the collection of liquid or semi-liquid materials, the collection means comprising:
   a) a central portion having an interior within which the materials are collected;
   b) at least one scraper element at a bottom of the central portion;
   c) a suction inlet located at a middle of the central portion; and,
   d) a plurality of rotary feeders within the interior of the central portion adjacent the scraper element, each rotary feeder having a vertical axis of rotation and comprising a plurality of radially extending protrusions for engagement with the collected material.

2. The collection means according to claim 1, wherein the central portion comprises at least two forward angled sides for guiding the collected material toward the suction inlet when the apparatus is in use.

3. The collection means according to claim 2, wherein the central portion is substantially trapezoidal or V-shaped in top view.

4. The collection means according to claim 3, wherein the suction inlet is located at an apex of the central portion.

5. The collection means according to claim 2, wherein there is a scraper element provided at the bottom of each forward angled side.

6. The collection means according to claim 1, wherein at least one rotary feeder has a rotational speed that is adjustable.

7. The collection means according to claim 1, wherein at least two of the rotary feeders have a rotational speed that is separately adjustable.

8. The collection means according to claim 1, wherein the collection means includes a pair of wings pivotally attached on opposite sides of the collection means and movable about a vertical pivot axis to vary a width of the collection means.

9. The collection means according to claim 8, wherein there is a rotary feeder provided for each wing.

10. The collection means according to claim 9, wherein there is a scraper element provided at the bottom of each wing and wherein the rotary feeder is located adjacent the scraper element.

11. The collection means according to claim 8, wherein the wings are able to be biased against a side-wall of an alley and able to move about the vertical pivot axis in response to changes in distance between the side-wall and the collection means when the apparatus is in use.

12. The collection means according to claim 1, wherein the suction inlet is variable in height with respect to ground level.

13. The collection means according to claim 12, wherein the suction inlet includes a snorkel that permits air to be entrained with the liquid or semi-liquid materials entering the suction inlet.

14. The collection means according to claim 12, wherein each rotary feeder has a rotational speed that is adjustable and wherein the rotational speed is determined according to the height of the suction inlet and the rate of travel of the apparatus.

15. The collection means according to claim 1, wherein the protrusions are scoop shaped.

16. The collection means according to claim 1, wherein the protrusions are rigid.

17. The collection means according to claim 1, wherein each rotary feeder is elevated with respect to ground level.

* * * * *